(12) United States Patent
Zhao

(10) Patent No.: US 8,101,229 B2
(45) Date of Patent: Jan. 24, 2012

(54) SEASONING FOR COOKING AND A PRODUCING METHOD THEREOF

(76) Inventor: Guangjun Zhao, Jil Lin (CN)

( * ) Notice: Subject to any disclaimer, the term of this patent is extended or adjusted under 35 U.S.C. 154(b) by 840 days.

(21) Appl. No.: 12/129,476

(22) Filed: May 29, 2008

(65) Prior Publication Data

US 2009/0196963 A1   Aug. 6, 2009

(30) Foreign Application Priority Data

Feb. 3, 2008   (CN) .......................... 2008 1 0010326

(51) Int. Cl.
*A23L 1/221* (2006.01)
(52) U.S. Cl. .......................... 426/650; 426/520; 426/638
(58) Field of Classification Search .................. 426/520, 426/523, 638, 650
See application file for complete search history.

(56) References Cited

FOREIGN PATENT DOCUMENTS

| CN | 1031315 A | 3/1989 |
|---|---|---|
| CN | 1105535 A | 7/1995 |
| CN | 1254520 A | 5/2000 |
| CN | 1254521 A | 5/2000 |
| CN | 1298659 A | * 6/2001 |
| CN | 1325645 A | * 12/2001 |

OTHER PUBLICATIONS

New Seasonings and the Use Thereof (Eds. Haitao Zhu, Jingtao Wu, Tao Fan, Weidong Tang 1999).
Glossary of Chinese Medicine at 220 and 467 (Eds. Jingwei Li, Yingao Yu, Jingfeng Cai, Xhibin Zhang, Yongxin Ou, Tietao Deng, Ming Ou 2005).
Chinese Pharmaceutical Glossary, 1977, (Ed. Najing University of Chinese Medicine 1977).
Yueli Cui, Xiande Ran, et al., Chinese Pharmaceutical Sea (1993).

* cited by examiner

*Primary Examiner* — Leslie Wong
(74) *Attorney, Agent, or Firm* — Marshall, Gerstein & Borun LLP

(57) ABSTRACT

A seasoning for cooking and a method of producing the seasoning. The seasoning comprises 31 varieties of spices, and a method of producing the seasoning includes stir-frying fructus anisi stellati and fructus tsaoko, respectively, and then mixing the obtained stir-fried fructus anisi stellati and stir-fried fructus tsaoko with the remaining 29 varieties of spices, and finally crushing the mixture. The seasoning of the invention has the characteristics of unique flavor, low toxic side effects, and safe edibility.

5 Claims, No Drawings

SEASONING FOR COOKING AND A PRODUCING METHOD THEREOF

BACKGROUND OF THE INVENTION

The invention relates generally to food and food preparation, and more particularly to a seasoning for cooking and a method of producing the seasoning.

Seasoning is a substance necessary for flavoring food, which is frequently used in large amounts when cooking dishes. Especially for Chinese dishes, a special and strong demand is growing for the seasoning due to the requirements of the special preparation methods and traditional cooking techniques.

With a long history, Chinese food has become a food of cultural heritage, which is enjoyed by people all over the world, and therefore widely used and disseminated. Thus, there is a worldwide need for the Chinese seasoning. Among various seasonings, spice is a seasoning that imparts typical savors such as aroma, pungent flavor, numbness, spicy flavor, bitterness, sweetness, and the like to the food, and is commonly made of spice plants.

Common, commercially available composite spicy seasonings include curry powder, five spices powder, Thirteen Spices, optimum spice, seasoning for making stuffing, and stewing seasoning. However, disadvantages of these common seasonings include the following: they lack a standard formula; they are generally made by conventional mixing and crushing; there is no principle basis for the prescription; side effects are unclear; the flavoring effect, which is provided by these common seasonings, is often unable to sufficiently reach desired requirements, and may be unable to meet the increasing requirements for dish tastes and even for a function of health care.

SUMMARY OF THE INVENTION

Accordingly, the invention provides a seasoning for cooking and a method of producing the seasoning. The seasoning, which comprises 31 varieties of spices, is produced by stir-frying fructus anisi stellati and fructus tsaoko, respectively, and then mixing the obtained stir-fried fructus anisi stellati and fructus tsaoko with the remaining 29 varieties of spices, and finally crushing the mixture.

By applying the principle for compounding properties and tastes in traditional Chinese medicine, and performing treatments for detoxifying the fructus anisi stellati and eliminating odors of the fructus tsaoko, a seasoning is produced that has a unique flavor, and decreased side effects caused by the fructus anisi stellati contained in traditional seasonings and thus has better food safety.

DETAILED DESCRIPTION OF EMBODIMENTS

The invention provides a seasoning for cooking with a unique flavor which is produced by simple techniques with a scientific prescription, by using the raw materials derived from natural herbs and applying a principle for compounding properties and tastes in traditional Chinese medicine, in order to satisfy the increasing demand for the seasoning quality.

The seasoning according to the invention comprises spices as follows: fructus schisandrae chinensis 4-6% by weight, fructus lycii 2-4% by weight, lemon 0.5-1.5% by weight, white pepper 3-5% by weight, arillus longan 2-4% by weight, radix angelicae dahuricae 1.5-2.5% by weight, fructus foeniculi 2-4% by weight, rhizoma curcumae longae 2-4% by weight, coriander 0.5-1.5% by weight, semen trigonellae 2-4% by weight, pericarpium citri reticulatae 3-5% by weight, fructus piperis longi 1.5-2.5% by weight, cortex acanthopanacis 4-6% by weight, radix saussureae lappae 2-4% by weight, rhizoma chuanxiong 1.5-2.5% by weight, semen alpiniae katsumadai 2-4% by weight, galanga resurrectionlily rhizome 3-5% by weight, bay leaf 1.5-2.5% by weight, rhizoma alpiniae officinarum 4-6% by weight, fructus tsaoko 1.5-2.5% by weight, bulbus lilii 4-6% by weight, thyme 2-4% by weight, semen sojae praeparatum 1.5-2.5% by weight, flos caryophylli 2-4% by weight, myristica fragrans houftuyn 2-4% by weight, rhizoma zingiberis 4-6% by weight, fructus anisi stellati 0.5-1.5% by weight, cortex cinnamomi 2-4% by weight, fructus amomi 3-5% by weight, brassica alba boiss 2-4% by weight, pericarpium zanthoxyli 2-4% by weight, provided that, after a final product is prepared using the raw materials in the above blending weight ranges, the sum of all components is 100% by weight.

The seasoning according to the invention is preferably produced as follows:

the fructus anisi stellati is slightly stir-fried in a hot wok with gentle heat for about 10 minutes to 20 minutes, and then taken out and cooled to room temperature and reserved; the fructus tsaoko is put into the wok and stir-fried with high heat, and then removed from the wok when it appears dark brown and foaming and starts giving off an aroma, and then sieved to remove ash and cooled to room temperature and reserved; the remaining 29 kinds of spices are then selected, washed, and dried to have a water content of 4 wt. % to 6 wt. %, and then the stir-fried fructus anisi stellati and the stir-fried fructus tsaoko are added thereto; the obtained mixture is uniformly mixed by physical stirring and crushed into 120 mesh to 150 mesh fine powders; and the fine powders are preferably packaged in the form of 50 g per pack and then irradiated by Co-60 (cobalt-60) for 24 hours to 48 hours.

The fructus anisi stellati in the seasoning of the invention is a spice commonly used in the traditional seasoning, but since the component of safrole contained in the fructus anisi stellati can result in poisoning when excessively ingested, producing side effects such as dizziness, nausea, limb weakness, numbness and so on, there exists a problem of food safety when using the fructus anisi stellati. By performing the treatment for detoxifying the fructus anisi stellati, specifically, slightly stir-frying the fructus anisi stellati in a hot wok with gentle heat for about 10 to 20 minutes, the seasoning of the invention has no toxicity even though containing the normally toxic fructus anisi stellati, and thus can be used safely.

In addition, the fructus tsaoko has odors when used without being stir-fried. Accordingly, by processing the fructus tsaoko, specifically, stir-frying it with high heat until it appears dark brown and foaming and starts giving off aroma, its odors can be removed.

By making up the seasoning of the invention based on the principle for the prescription in traditional Chinese medicine, and performing the treatments for detoxifying the fructus anisi stellati and eliminating odors of the fructus tsaoko during the production process, the seasoning of the invention does not only have such a unique flavor as to make food tastes delicious and rich, but also has decreased side effects and thus can be used safely.

EXAMPLE

The invention will be further described by an example.

The components in the formula of the Example are as follows: fructus schisandrae chinensis 50 g, fructus lycii 30 g, lemon 10 g, white pepper 40 g, arillus longan 30 g, radix angelicae dahuricae 20 g, fructus foeniculi 30 g, rhizoma curcumae longae 30 g, coriander 10 g, semen trigonellae 30 g, pericarpium citri reticulatae 40 g, fructus piperis longi 20 g, cortex acanthopanacis 50 g, radix saussureae lappae 30 g, rhizoma chuanxiong 20 g, semen alpiniae katsumadai 30 g, galanga resurrectionlily rhizome 40 g, bay leaf 20 g, rhizoma alpiniae officinarum 50 g, fructus tsaoko 20 g, bulbus lilii 50 g, thyme 30 g, semen sojae praeparatum 20 g, flos caryophylli 30 g, myristica fragrans houttuyn 30 g, rhizoma zingiberis 50 g, fructus anisi stellati 10 g, cortex cinnamomi 30 g, fructus amomi 40 g, brassica alba boiss 30 g, pericarpium zanthoxyli 30 g.

The producing method in the Example is as follows:

the fructus anisi stellati (10 g) is slightly stir-fried in a hot wok with gentle heat for 10 minutes, and then taken out and cooled to room temperature and reserved; the fructus tsaoko (20 g) is put into the wok and stir-fried with high heat, and then taken out when it appears dark brown and foaming and starts giving off aroma, and after that, it is sieved for ash removal and cooled to room temperature and reserved; the remaining 29 varieties of spices (970 g in total) are selected, washed, and dried respectively, and then the stir-fried fructus anisi stellati and the stir-fried fructus tsaoko are added thereto; the obtained mixture is uniformly mixed by physical stirring and crushed into 120-mesh fine powder; and the thus-crushed fine powders are packaged in the form of 50 g per pack with 20 packets obtained in total, and then sent to the final product storage after being irradiated by Co-60 for 24 hours.

The seasoning of the invention can be used in various foods, for example, various meat dishes and vegetable dishes which are cooked by frying, stir-frying, stewing, pickling in soy sauce and salting, stuffing of flavor snacks, soups, pickles, hot pot soup bases, hot pot flavorings, hot pot seasonings as well as various wheaten foods, and moreover the addition amount thereof can be appropriately determined depending on the taste of the consumer.

The invention claimed is:

1. A seasoning for cooking, comprising a mixture of the following spices in the following weight proportions on a raw material basis:

fructus schisandrae chinensis 4-6% by weight, fructus lycii 2-4% by weight, lemon 0.5-1.5% by weight, white pepper 3-5% by weight, arillus longan 2-4% by weight, radix angelicae dahuricae 1.5-2.5% by weight, fructus foeniculi 2-4% by weight, rhizoma curcumae longae 2-4% by weight, coriander 0.5-1.5% by weight, semen trigonellae 2-4% by weight, pericarpium citri reticulatae 3-5% by weight, fructus piperis longi 1.5-2.5% by weight, cortex acanthopanacis 4-6% by weight, radix saussureae lappae 2-4% by weight, rhizoma chuanxiong 1.5-2.5% by weight, semen alpiniae katsumadai 2-4% by weight, galanga resurrectionlily rhizome 3-5% by weight, bay leaf 1.5-2.5% by weight, rhizoma alpiniae officinarum 4-6% by weight, fructus tsaoko 1.5-2.5% by weight, bulbus lilii 4-6% by weight, thyme 2-4% by weight, semen sojae praeparatum 1.5-2.5% by weight, flos caryophylli 2-4% by weight, myristica fragrans houttuyn 2-4% by weight, rhizoma zingiberis 4-6% by weight, fructus anisi stellati 0.5-1.5% by weight, cortex cinnamomi 2-4% by weight, fructus amomi 3-5% by weight, brassica alba boiss 2-4% by weight, pericarpium zanthoxyli 2-4% by weight, wherein the sum of all components is 100% by weight, and wherein the fructus anisi stellati is detoxified by stir-frying and an odor of the fructus tsaoko is removed by stir-frying.

2. The seasoning for cooking of claim 1, prepared by the method comprising:

lightly stir-frying the fructus anisi stellati for a time and a temperature sufficient to detoxify the fructus anisi stellati, and then cooling the fructus anisi stellati to room temperature and reserving the stir-fried fructus anisi stellati;

separately stir-frying the fructus tsaoko in the wok at a temperature sufficiently high and for a time sufficient to remove odors, sieving the fructus tsaoko to remove ash, cooling the stir-fried and sieved fructus tsaoko to room temperature, and reserving the fructus tsaoko;

mixing the remaining spices with the stir-fried fructus anisi stellati and the stir-fried fructus tsaoko ; and, uniformly mixing the resulting mixture by physical stirring and crushing the uniform mixture into fine powders.

3. The seasoning for cooking of claim 2, the method comprising stir-frying the fructus tsaoko in a hot work at a high heat higher than that used for stir-frying the fructus anisi stellati until dark brown and foaming and starting to give off aroma, and then removing the fructus tsaoko from the wok before sieving.

4. The seasoning for cooking of claim 2, the method comprising stir-frying the fructus anisi stellati in a hot wok at a gentle temperature less than that used to stir-fry the fructus tsaoko for 10 minutes to 20 minutes, and then removing the stir-fried fructus anisi stellati from the wok.

5. The seasoning for cooking of claim 4, the method comprising stir-frying the fructus tsaoko in a hot work at a high heat higher than that used for stir-frying the fructus anisi stellati until dark brown and foaming and starting to give off aroma, and then removing the fructus tsaoko from the wok before sieving.

* * * * *